Dec. 22, 1925.
A. J. STRETCH
1,566,629
SPRING SUSPENSION DEVICE
Filed Feb. 16, 1925
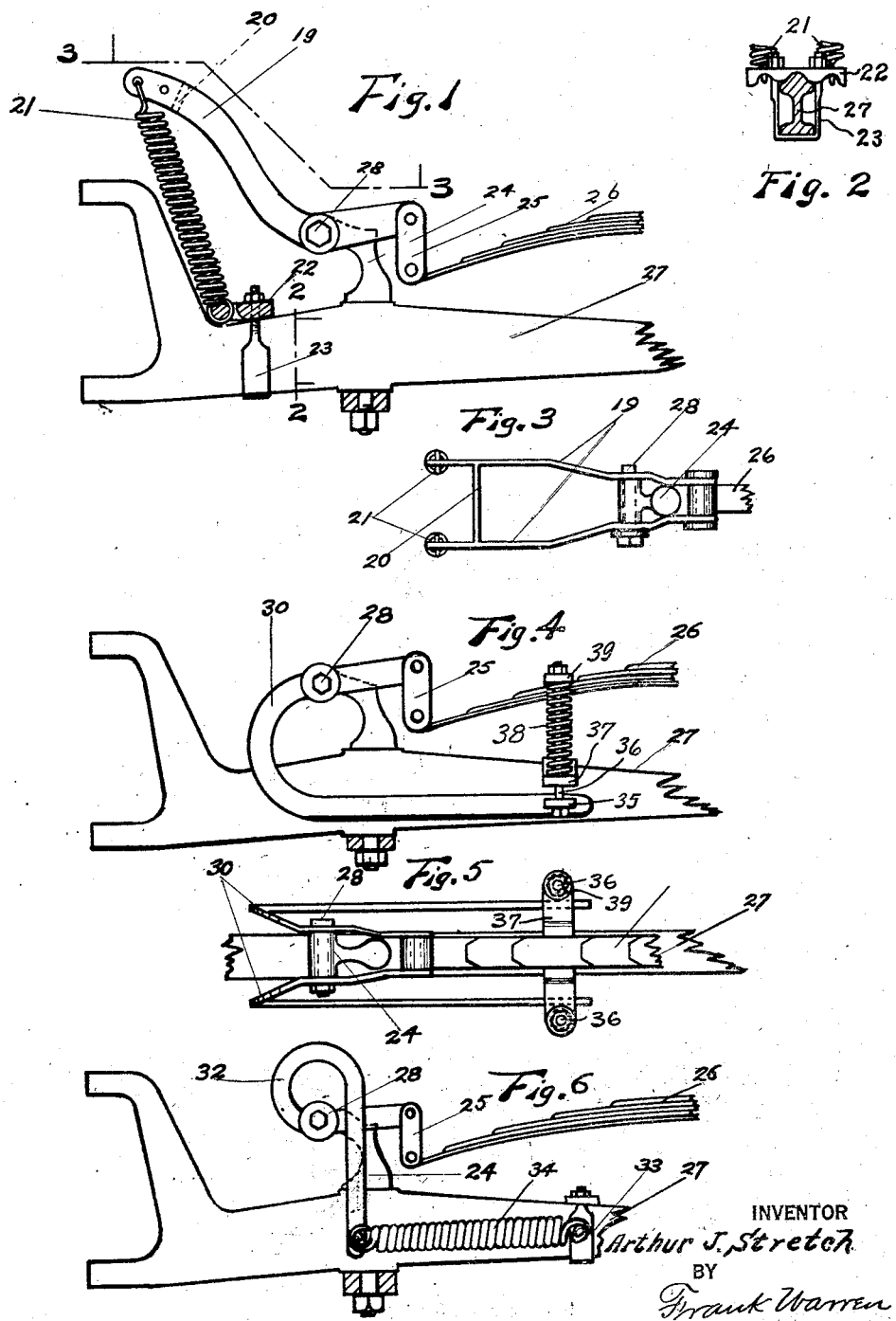
INVENTOR
Arthur J. Stretch
BY
Frank Warren
ATTORNEY Patented Dec. 22, 1925.

1,566,629

UNITED STATES PATENT OFFICE.

ARTHUR J. STRETCH, OF SEATTLE, WASHINGTON.

SPRING SUSPENSION DEVICE.

Application filed February 16, 1925. Serial No. 9,451.

*To all whom it may concern:*

Be it known that I, ARTHUR J. STRETCH, a citizen of the United States, residing at Seattle, in the county of King and State of Washington, have invented a certain new and useful Improvement in Spring Suspension Devices, of which the following is a specification.

My invention relates to improvements in spring suspension and equalizing devices for motor vehicles and the object of my improvement is to provide a spring suspension and equalizing device that will act in conjunction with the ordinary vehicle spring to absorb the usual jolts, shocks and vibrations, and prevent any rebound in the operation of the motor vehicle and that will tend at all times to keep the vehicle body in a horizontal position even though the wheels on one side are elevated higher than the wheels on the other side of the vehicle.

Another object is to provide a spring suspension and equalizing device in which the ends of the vehicle springs are secured to the frame or axle upon which the springs are supported by resilient means which permits the end of the spring to move toward or away from its supporting member, thereby enabling the spring to adjust itself and always keep the body of the vehicle substantially horizontal.

Other and more specific objects will be apparent from the following description taken in connection with the accompanying drawings.

In the drawings Fig. 1 is a view in elevation showing a spring suspension constructed in accordance with my invention, one end only of the vehicle's spring and axle being shown.

Fig. 2 is a sectional view substantially on broken lines 2—2 of Fig. 1.

Fig. 3 is a detached plan view substantially on broken line 3—3 of Fig. 1.

Fig. 4 is a fragmentary side elevation of a modified form of my invention.

Fig. 5 is a plan view of the device shown in Fig. 4.

Fig. 6 is a view in side elevation of another modified form of my spring suspension.

Referring to the drawings, throughout which like reference numerals indicate like parts, the numeral 27 designates a motor vehicle axle of well known form and 24 designates a shackle support constructed in accordance with my invention, and arranged to be secured to the axle 27 by a suitable stud bolt preferably integral with said shackle support.

19 indicates two lever arms rigidly secured together by cross bar 20 and arranged to be pivotally secured by bolt 28 to shackle support 24. The inner ends of the lever arms 19 are connected by shackle links 25 with the usual motor vehicle spring 26. The outer ends of lever arms 19 are connected with the upper ends of the resilient tension springs 21 whose lower ends are connected with clip 22 that is rigidly secured to axle 27 by U bolts 23.

The pivot bolt 28 is much closer to the point of connection of shackle link 25 than it is to the point of connection of tension spring 21, thereby providing a leverage greatly in favor of tension spring 21.

In the operation of this device the weight of the usual body supported on the vehicle spring 26 is borne by shackle links 25 which are connected with the shorter ends of lever arms 19 and are thereby resiliently supported. As the vehicle spring 26 flexes and vibrates under the usual driving condition to which it is subjected when supporting a load, the spring 21 will expand and contract, thereby permitting the short end of lever arm 19 to move up and down, thus communicating the resilience of spring 21 to the spring 26 and producing an easier riding, more smoothly operating spring suspension. The movement of the ends of the vehicle springs toward and away from axle 27 serves very efficiently to keep the motor vehicle body that is supported on vehicle springs 26 in a substantially horizontal position.

An important feature of this construction resides in the provision of the resilient supporting means for the end of spring 26 so that said spring 26 does not need to furnish all of the resilience in itself, but a portion of said resilience is provided for by the support at the end of said spring. As each equalizer has independent action each is free to adjust itself to the road irregularities and being individual in action take care of the rear wheels the strains of which traveling diagonally across the frame and away from the axle 27 and serves efficiently to keep the vehicle body that is supported on the springs 26 in a substantially horizontal position.

In Figs. 4 and 5 I have shown a modification of the invention in which the shape of the lever arms are varied and the auxiliary spring is a compression spring and is connected with the main axle in a novel and efficient manner.

In this construction I show the same axle 27 and vehicle spring 26 and the same shackle support 24 as in the preceding figures, but provide instead of the levers 19, two lever arms 30 which are of substantially J shape and are fulcrumed by the bolt 28 on shackle support 24, the shorter end of said lever arms being connected by shackle link 25 with the end of vehicle spring 26.

From fulcrum points 28 the levers 30 curve downwardly and inwardly and the longer ends of said levers 30 extend inwardly substantially parallel to axle 27 past the point of connection of shackle links 25. The longer ends of levers 30 are provided with lugs 35 that are connected with bolts 36 that pass upwardly through a rigid saddle member 37 on axle 27, and are provided above said saddle member with springs 38 upon the top end of which are caps 39.

In operation the downward pressure on springs 26 will tend to press downwardly on the longer ends of lever arms 30; thereby tending to compress the springs 38, which springs 38 will act in conjunction with the vehicle spring 26 to absorb the shock and vibration, and check rebound. This form of construction is particularly advantageous for installation on certain types of automobiles, where it is desired to have the lever arms out of the way and substantially out of sight.

In Fig. 6, I have shown another modification of my invention in which I provide lever arms 32 pivoted by bolts 28 to shackle support 24 and having their shorter ends extending inwardly and connected by shackle links 25 with the usual vehicle spring 26. The longer ends of the lever arms 32 are formed into loops which extend upwardly and around pivot 28 and thence straighten out and project downwardly and terminate at points alongside of the vehicle axle 27.

The longer ends of links 32 are connected by tension springs 34 with suitable clips 33 that are rigidly secured to axle 27 so that a downward thrust exerted on shackle links 25 will tend to move the longer ends of lever arms 32 outwardly thus extending tension springs 34, which springs 34 will act in conjunction with the usual vehicle spring 26 to absorb the shock and vibration, and check rebound due to the movement of the motor vehicle over uneven surfaces in substantially the same manner as described in connection with Figs. 1 to 5 inclusive.

From the preceding description it will seem that I have provided a resilient connection for the ends of the usual vehicle springs, thereby adding to the efficiency to the usual springs and producing a smoother and easier riding construction, and at the same time permitting vertical movement of the ends of the springs to compensate for differences in elevation of the wheels on opposite sides of the vehicle and keep the vehicle body horizontal.

The foregoing description and accompanying drawings clearly disclose a preferred embodiment of my invention, but it will be understood that this disclosure is merely illustrative and that numerous changes may be made within the scope and spirit of the following claim.

I claim:

In an equalizing device of the class described, the combination with a motor vehicle having an axle and a transverse spring, of a rigid shackle support extending upwardly from said axle, levers fulcrumed on said shackle support, said levers having substantially horizontal shorter arms that extend inwardly and are connected with the ends of said vehicle springs and having longer arms that extend outwardly and upwardly, and helical tension springs secured to said axle and connected with said longer lever arms and coacting with said vehicle springs to afford a resilient support and permit equalizing movement of the ends of said vehicle springs toward and away from said axle.

In witness whereof, I hereunto subscribe my name this 6th day of February A. D. 1925.

ARTHUR J. STRETCH.